United States Patent
Robertson, Jr. et al.

(10) Patent No.: US 11,927,319 B1
(45) Date of Patent: Mar. 12, 2024

(54) VEHICLE LIGHTING SYSTEM INCLUDING LAMP ASSEMBLY WITH ONE OR MORE SECTIONS HAVING VARIABLE LIGHT TRANSMISSIVITY

(71) Applicant: Ford Global Technologies, LLC, Dearborn, MI (US)

(72) Inventors: Michael Robertson, Jr., West Bloomfield, MI (US); Venkatesh Krishnan, Canton, MI (US); Segundo Baldovino, Novi, MI (US); Tyler Hamilton, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/140,841

(22) Filed: Apr. 28, 2023

(51) Int. Cl.
*F21S 41/64* (2018.01)
*F21S 41/40* (2018.01)
*G02F 1/1334* (2006.01)

(52) U.S. Cl.
CPC .............. *F21S 41/645* (2018.01); *F21S 41/40* (2018.01); *G02F 1/1334* (2013.01)

(58) Field of Classification Search
CPC .......... F21S 41/65; F21S 41/645; F21S 41/40; F21W 2102/13; F21W 2102/135; F21W 2102/165; F21W 2102/14; F21W 2102/145; F21W 2102/15; F21W 2102/155; F21W 2102/16; F21W 2103/20; F21V 14/003; G02F 1/1334
See application file for complete search history.

(56) References Cited

U.S. PATENT DOCUMENTS

| | | | |
|---|---|---|---|
| 4,872,745 A * | 10/1989 | Fujisawa | B60Q 1/04 359/267 |
| 10,197,236 B2 | 2/2019 | Robinson | |
| 2003/0206418 A1 * | 11/2003 | Strazzanti | C09K 19/60 362/540 |
| 2006/0250809 A1 | 11/2006 | Strazzanti | |
| 2018/0149331 A1 * | 5/2018 | Gloss | F21S 43/26 |
| 2021/0190284 A1 * | 6/2021 | Paroni | F21S 41/295 |
| 2022/0105864 A1 * | 4/2022 | Stefanov-Wagner | B60Q 1/444 |
| 2023/0135025 A1 * | 5/2023 | Muegge | B60Q 1/2607 362/520 |

FOREIGN PATENT DOCUMENTS

| | | | | |
|---|---|---|---|---|
| CN | 108870311 A * | 11/2018 | ........... | F21S 41/148 |
| CN | 212869627 U | 4/2021 | | |
| CN | 217356722 U | 9/2022 | | |
| DE | 102013108811 A1 * | 2/2015 | ......... | F21S 48/1136 |
| DE | 102019213247 A1 * | 3/2021 | ............... | B60Q 1/38 |
| EP | 2979926 B1 | 8/2019 | | |
| JP | 2003276501 A * | 10/2003 | | |
| JP | 2007227202 A * | 9/2007 | | |
| KR | 101060420 B1 | 8/2011 | | |
| WO | WO-2020031472 A1 * | 2/2020 | ............... | B60Q 1/30 |

* cited by examiner

*Primary Examiner* — Erin Kryukova

(74) *Attorney, Agent, or Firm* — Vichit Chea; Carlson, Gaskey & Olds, P.C.

(57) ABSTRACT

A lighting system may include a lamp assembly including a lens assembly, wherein the lens assembly includes a first section and a second section, wherein the first and second sections each include a material having variable light transmissivity in response to an applied voltage, and wherein the light transmissivity of the first section is adjustable independent of the light transmissivity of the second section.

15 Claims, 4 Drawing Sheets

VEHICLE LIGHTING SYSTEM INCLUDING LAMP ASSEMBLY WITH ONE OR MORE SECTIONS HAVING VARIABLE LIGHT TRANSMISSIVITY

TECHNICAL FIELD

This disclosure relates to a lighting system for a motor vehicle. The lighting system includes a lamp assembly with one or more sections having variable light transmissivity. A corresponding method is also disclosed.

BACKGROUND

Motor vehicles are known to include lighting systems with a number of lighting and signaling devices. Such devices include lamp assemblies configured for forward illumination, including being operable as high beam headlamp, a low beam headlamp, turn signals, fog lights, etc.

SUMMARY

In some aspects, the techniques described herein relate to a lighting system for a motor vehicle, including: a lamp assembly including a lens assembly, wherein the lens assembly includes a first section and a second section, wherein the first and second sections each include a material having variable light transmissivity in response to an applied voltage, and wherein the light transmissivity of the first section is adjustable independent of the light transmissivity of the second section.

In some aspects, the techniques described herein relate to a lighting system, wherein: the lamp assembly includes a first light configured to emit light through the first section and a second light configured to emit light through the second section, when the first light is activated, the lamp assembly is configured such that the first section is transparent, and when the second light is activated, the lamp assembly is configured such that the second section is transparent.

In some aspects, the techniques described herein relate to a lighting system, wherein: when the first light is not activated, the lamp assembly is configured such that the light transmissivity of the first section is adjustable to be either opaque or partially opaque; and when the second light is not activated, the lamp assembly is configured such that the light transmissivity of the second section is adjustable to be either opaque or partially opaque.

In some aspects, the techniques described herein relate to a lighting system, wherein: when the first light is activated, lamp assembly is configured such that the second section is opaque, and when the second light is activated, lamp assembly is configured such that the first section is opaque.

In some aspects, the techniques described herein relate to a lighting system, further including: a power source; and a controller configured to command the power source to selectively apply voltage to the first light, the second light, the material of the first section, and the material of the second section.

In some aspects, the techniques described herein relate to a lighting system, wherein: the first light and the material of the first section are electrically connected to the power source in parallel, such that when the first light is activated, voltage is applied to the material of the first section such that the first section is transparent, and the second light and the material of the second section are electrically connected to the power source in parallel, such that when the second light is activated, voltage is applied to the material of the second section such that the second section is transparent.

In some aspects, the techniques described herein relate to a lighting system, further including: a sensor electrically coupled to the controller, wherein the sensor is configured to generate a signal indicative of an environmental condition adjacent the vehicle, and wherein the controller is configured to command the power source to selectively apply voltage to the material of the first section and the material of the second section in response to a signal from the sensor.

In some aspects, the techniques described herein relate to a lighting system, wherein: the first light is a low beam headlamp, and the second light is a high beam headlamp.

In some aspects, the techniques described herein relate to a lighting system, wherein: the lens assembly includes a third section, the third section includes a material configured to adjust a light transmissivity in response to an applied voltage, and the light transmissivity of the third section is adjustable independent of the light transmissivity of the first and second sections.

In some aspects, the techniques described herein relate to a lighting system, wherein: the lamp assembly includes a third light configured to emit light through the third section, when the third light is activated, the lamp assembly is configured such that the third section is transparent, and the third light is configured to indicate a turn signal.

In some aspects, the techniques described herein relate to a lighting system, wherein the material of the first section is provided by a polymer-dispersed liquid-crystal device (PDLC), and the material of the second section is provided by a PDLC.

In some aspects, the techniques described herein relate to a lighting system, wherein the material of the first section is a first layer of PDLC film, and the material of the second section is a second layer of PDLC film.

In some aspects, the techniques described herein relate to a lighting system, wherein the lens assembly includes a third section including a non-adjustable tint substantially matching a tint of the first and second sections when a voltage is not applied to the first and second sections.

In some aspects, the techniques described herein relate to a lighting system for a motor vehicle, including: a lamp assembly including a lens assembly, wherein the lens assembly includes a first section and a second section, wherein the first section includes a material having variable light transmissivity in response to an applied voltage, wherein the second section includes a material of non-adjustable light transmissivity exhibiting a tint substantially matching a tint of the first section when the first section is opaque.

In some aspects, the techniques described herein relate to a lighting system, wherein the material of the first section is adjustable between being opaque, partially opaque, and transparent.

In some aspects, the techniques described herein relate to a lighting system, wherein, when the first section is opaque, the first section and second section both exhibit a dark black tint.

In some aspects, the techniques described herein relate to a method, including: adjusting a light transmissivity of a first section of a lens assembly independent of a second section of the lens assembly, wherein the lens assembly is part of a lamp assembly of a motor vehicle.

In some aspects, the techniques described herein relate to a method, further including: adjusting the first section such that the first section is transparent when a first light configured to emit light through the first section is activated; and adjusting the second section such that the second section is transparent when a second light configured to emit light through the second section is activated.

In some aspects, the techniques described herein relate to a method, wherein: when the first light is not activated, adjusting the light transmissivity of the first section to be either opaque or partially opaque; and when the second light is not activated, adjusting the light transmissivity of the second section to be either opaque or partially opaque.

In some aspects, the techniques described herein relate to a method, wherein: the adjusting step is performed based on signals from a sensor, wherein the sensor is configured to generate signals indicative of environmental conditions adjacent the vehicle.

DETAILED DESCRIPTION

This disclosure relates to a lighting system for a motor vehicle. The lighting system includes a lamp assembly with one or more sections having variable light transmissivity. A corresponding method is also disclosed. Among other benefits, the lighting system can provide the motor vehicle with a unique aesthetic appearance, such as when the section is opaque, while also selectively permitting light to shine through the section, such as when the section is transparent or partially opaque. These and other benefits will be appreciated from the below.

Figure 1:
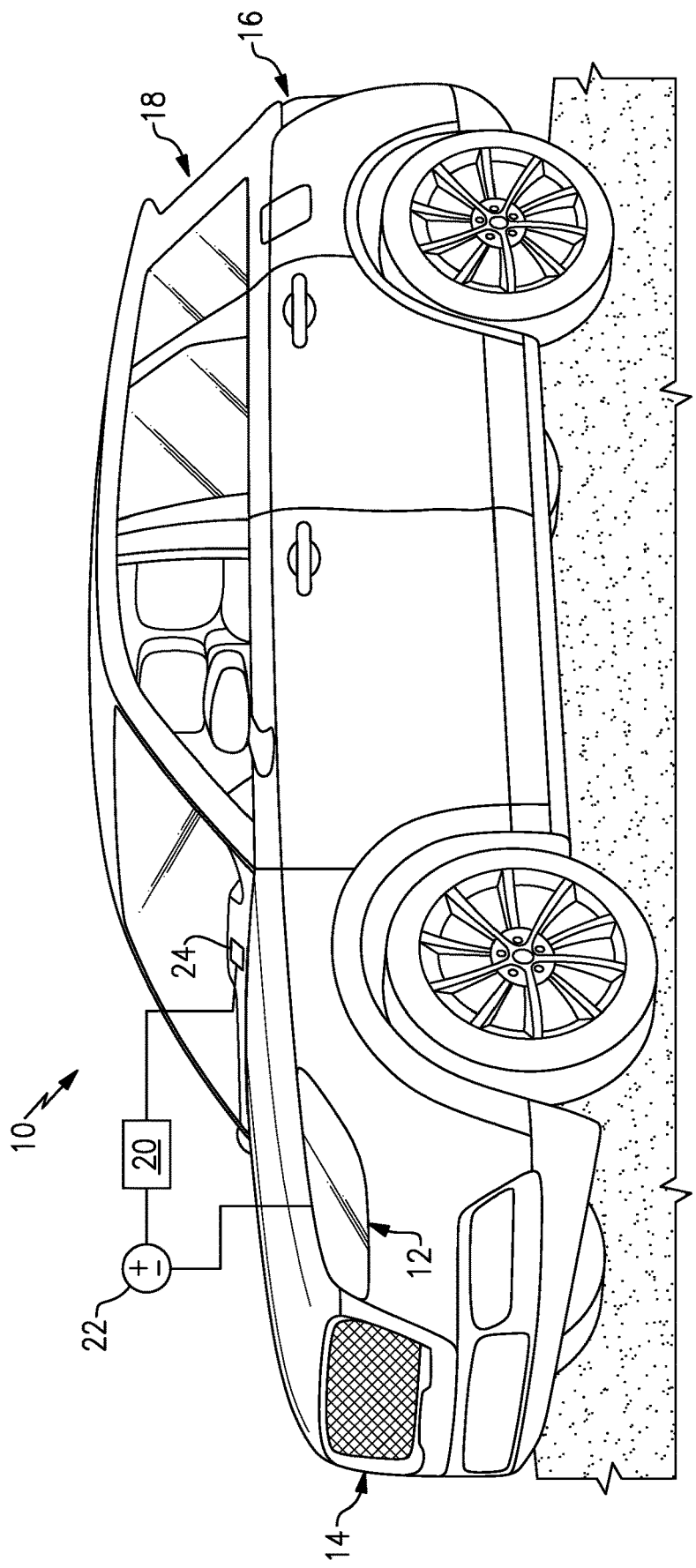
FIG. 1 is a front perspective view of a motor vehicle.

FIG. 1 illustrates a motor vehicle ("vehicle") 10 from a front perspective view. In this example, the vehicle 10 is a sport utility vehicle (SUV). It should be understood that this disclosure is not limited to any particular vehicle type, and extends to cars, trucks (including pickup trucks), vans, etc. This disclosure also extends to all-terrain vehicles (ATVs), off-road vehicles (ORVs), and trailers. Certain aspects of this disclosure may even apply to lighting systems that are not associated with a motor vehicle or trailer, such as lighting systems for security systems associated with residential or commercial properties.

In FIG. 1, the vehicle 10 includes a plurality of lamp assemblies, including lamp assemblies configured to function as headlamps, turn signals, etc. In this example, the vehicle 10 includes four lamp assemblies 12, 14, 16, 18. The vehicle 10 may include a different number of lamp assemblies.

Lamp assembly 12 is a front, driver-side (in geographic regions such as North America) lamp assembly configured to operate as a headlamp, turn signal, daytime running lamp, high beam headlamp, low beam headlamp, and/or a four-way flasher, among other possibilities. The lamp assembly 14 is configured structurally and functionally similar to the lamp assembly 12, with the exception that the lamp assembly 14 is reflected about the centerline of the vehicle 10. The lamp assembly 14 provides a front, passenger-side lamp assembly. Lamp assembly 16 is a rear, driver-side lamp assembly configured to operate as a tail lamp, brake light, turn signal, and/or a four-way flasher, among other possibilities. The lamp assembly 18 is configured structurally and functionally similar to the lamp assembly 16, with the exception that the lamp assembly 18 is reflected about the centerline of the vehicle 10 to provide a rear, passenger-side lamp assembly.

In this example, each of the lamp assemblies 12, 14, 16, 18 are in communication with a controller 20 and a power source 22. The controller 20, in turn, is in communication with at least one sensor 24. The lamp assemblies 12, 14, 16, 18 may be considered to be part of a greater light assembly of the vehicle 10, which, in an example, includes the controller 20, a power source 22, and/or at least one sensor 24, among other possible structures.

It should be understood that the controller 20 could be part of an overall vehicle control module, such as a vehicle system controller (VSC), or may be part of a body control module (BCM). Alternatively, the controller 20 may be a stand-alone controller separate from the VSC and the BCM. Further, the controller 20 may be programmed with executable instructions for interfacing with and operating the various components of the vehicle 10. The controller 20 additionally includes hardware and software, and further includes a processing unit and non-transitory memory for executing the various control strategies and modes of the vehicle system.

In this example, the power source 22 may be a battery of the vehicle 10. The power source 22 may be a 12 Volt battery. In another example, the power source 22 may be a high voltage traction battery pack configured to power electric motors used to propel the vehicle 10. In this regard, the vehicle 10 may be an electrified vehicle.

Sensor 24 is configured to generate a signal indicative of an environmental condition of the vehicle 10. In a particular example, the sensor 24 is a rain sensor. The sensor 24 could also be a temperature sensor, a light sensor, etc. While only one sensor 24 is schematically illustrated in FIG. 1, multiple types of sensors, each configured to generate a signal indicative of a different environmental condition of the vehicle 10, may be in communication with the controller 20. Sensor 24 is not required in all examples.

Figure 2:
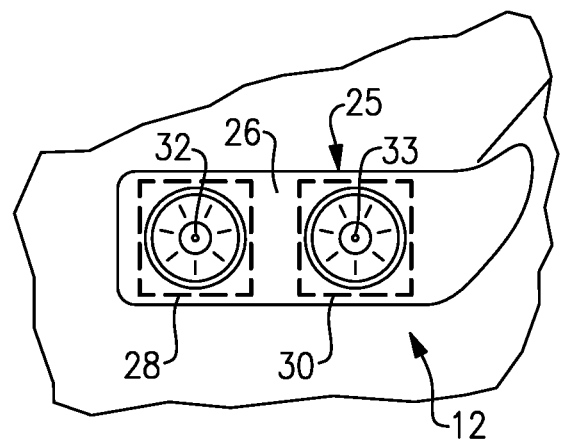
FIG. 2 is a close-up view of one of the light assemblies of the motor vehicle.

The lamp assembly 12 is shown in more detail in FIG. 2. While the lamp assembly 12 is shown, it should be understood that the lamp assemblies 14, 16, 18 may be configured similarly. Specifically, each of the lamp assemblies 14, 16, 18 are electrically connected to the controller 20 and power source 22, and are operable in substantially the same manner.

Lamp assembly 12 includes a lens assembly 25 configured to cover at least one light. Here, the lens assembly 25 includes outer lens 26, which may be made of a transparent material such as glass. The outer lens 26 may be clear, in an example. The outer lens 26, in this example, includes a first section 28 and a second section 30. The first section 28 is a portion of the surface area of the outer lens 26, and the second section 30 is another portion of the surface area of the outer lens 26. The first and second sections 28, 30 do not overlap one another, in this example.

In the illustrated example, the first section 28 is on a side (relative to FIG. 2) of the second section 30. This disclosure extends to sections that are arranged in other ways, including sections that are vertically stacked relative to one another, etc.

The first and second section 28, 30 may be distinct sections with walls or other dividers separating different types of lights, such as lights of different colors, for example. In another embodiment, there are no separators such as walls dividing the first and second sections 28, 30.

The first and second section 28, 30 may also be provided by separate lighting subassemblies within the light assembly 12.

The lens assembly 25 covers a first light 32 and a second light 33, in this example, when the lens assembly 25 is viewed from a front perspective, as in FIG. 2. The first light 32, when activated (i.e., illuminated or turned on), is operable to function as a high beam headlamp. The second light 33, when activated, is operable to function as a low beam headlamp. Light emitted from first light 32 passes through the first section 28, and light emitted from the second light 33 passes through the second section 30.

The first light 32 and the second light 33 may be provided by light emitting diodes (LEDs). The first and second lights 32, 33 could each be provided by a single, respective light. Alternatively, the first light 32 could be provided by a plurality of lights, and the second light 33 could be provided by a plurality of other lights. The first and second lights 32, 33 are activatable by the controller 20.

In this disclosure, the first and second sections 28, 30 include a material, such as a film, configured to selectively adjust the light transmissivity of the first and second sections 28, 30. Transmissivity is a measure of the percentage of light that can pass through a material without being absorbed or reflected.

In a particular example, the material is responsive to an applied voltage, and, depending on the applied voltage, can change the first and second sections 28, 30 between states of being transparent, partially opaque (i.e., translucent), and opaque. In this disclosure, the transparent state refers to a state in which substantially 100% of light can pass through the first and second sections 28, 30, whereas the opaque state refers to a state in which substantially 0% of light can pass through the first and second sections 28, 30. The partially opaque state refers to states in which some, but not all, light can pass through the first and second sections 28, 30.

To achieve a partially opaque state, the power source 22 can be configured to apply an infinitely adjustable level of voltage between 0 Volts, which corresponds to the opaque state, and a voltage level corresponding to the transparent state. In another example, the power source 22 is configured to incrementally step the voltage up and down by a particular amount, such as in 5 Volt increments, when moving between 0 Volts and the voltage level corresponding to the transparent state.

In an example, the first and second sections 28, 30 exhibit a unique tint, including being tinted with a color different than the remainder of outer lens 26. For example, if the first and second sections 28, 30 are dyed a particular color, such as black, then the first and second sections 28, 30 exhibit a darkest black tint in the opaque state, while exhibiting a lighter black tint, and in some cases a substantially clear appearance, in the transparent state. Likewise, when in the partially opaque state, the first and second sections 28, 30 exhibit a black tint that is not as dark as the tint in the opaque state. As such, the adjustable light transmissivity of the first and second sections 28, 30 can be used to provide the lens assembly 25, the lamp assembly 12, and the vehicle 10 overall with a distinct aesthetic appearance.

A user may set the light transmissivity to achieve a desired aesthetic by providing a particular input relative to the vehicle, such as by using a human-machine interface, such as a touchscreen, within a passenger cabin of the vehicle 10, or using the user's smartphone, for example.

The user may be permitted to adjust the transmissivity of the first and second sections 28, 30, and any corresponding sections of the other light assemblies 14, 16, 18, in certain conditions, such as when the vehicle 10 is in park. In this way, the vehicle 10 can be displayed for viewing with the lamp assemblies 12, 14, 16, 18 having a desired aesthetic appearance.

Alternatively or additionally, the controller 20 may command the power source 22 to adjust the transmissivity of the first and/or second sections 28, 30 in response to a signal from the sensor 24. In an example, if a signal from the sensor 24 indicates it is raining, or dark, adjacent the vehicle 10, the controller 20 may command the power source 22 to apply a voltage such that the first and second sections 28, 30 are in the transparent state.

In a particular aspect of this disclosure, the light transmissivity of the first and second sections 28, 30 are independently adjustable. For instance, the first section 28 could exhibit a level of light transmissivity different than the second section 30. Further, the level of light transmissivity of the first section 28 could be adjusted while holding the level of light transmissivity of the second section 30 constant.

Figure 3:
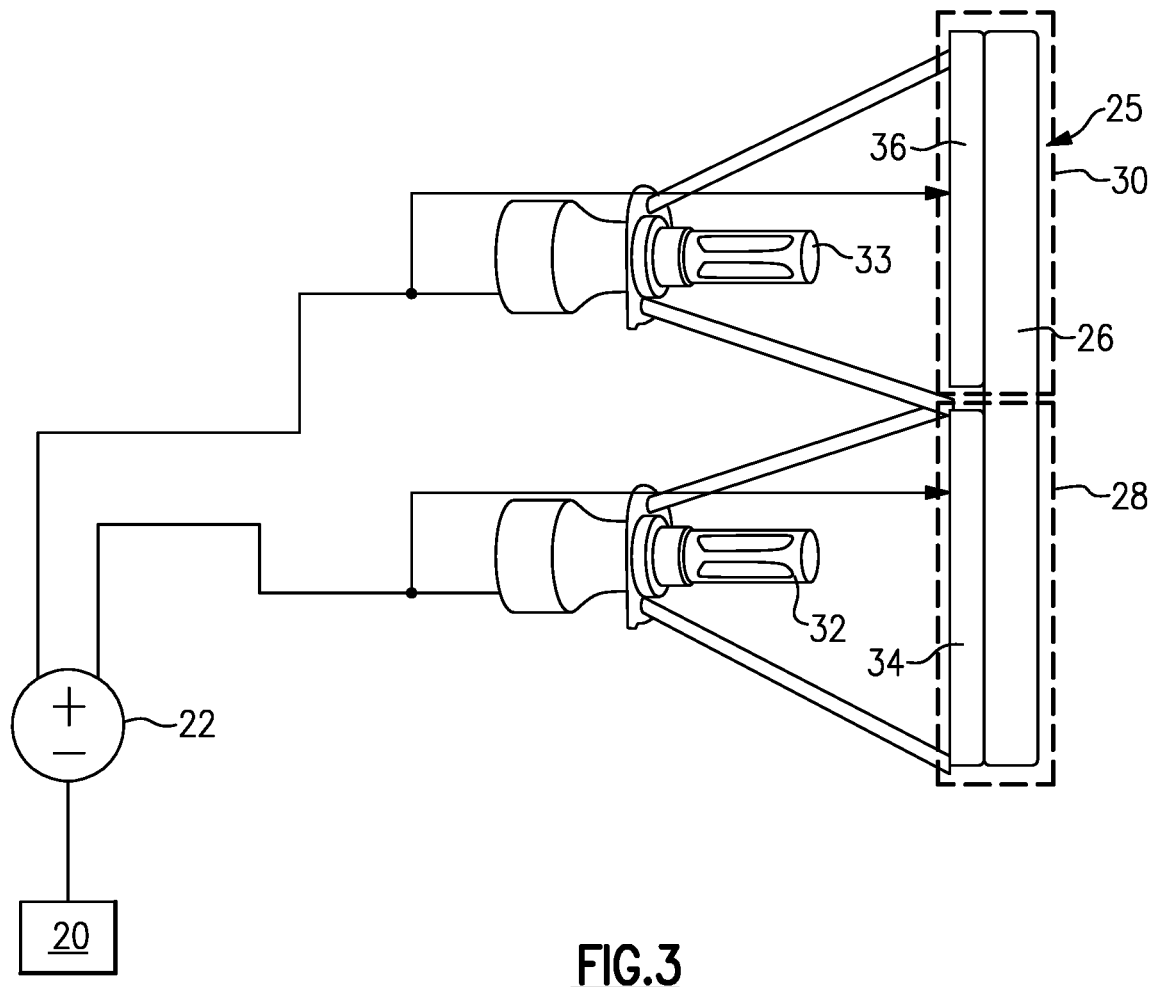
FIG. 3 is a schematic representation of the light assembly of FIG. 2.

In FIG. 3, the first section 28 includes a first layer of film 34 applied to a side of the outer lens 26 facing the first light 32. Further, the second section 30 includes a second layer of film 36 applied to the side of the outer lens 26 facing the second light 33. The first layer of film 34 exhibits a surface area equal to the surface area of the first section 28, while the second layer of film 36 exhibits a surface area equal to the surface area of the second section 30. In an example, the first layer of film 34 is coextensive with the first section 28, and the second layer of film 36 is coextensive with the second section 30.

The first and second layers of film 34, 36 are each provided by independent layers of film containing polymer-dispersed liquid-crystal devices (PDLCs), which are liquid crystals. The first and second layers of film 34, 36 each include a thin layer of a transparent, conductive material. The PDLCs may be treated with colorants or dyes such that the first and second layers of film 34, 36 exhibit a desired tint. The tint and transmissivity of the first and second layers of film 34, 36 is inversely related, because, as the transmissivity of the first and second layers of film 34, 36 increases, the tint decreases. Likewise, as the transmissivity decreases, the tint increases.

While PDLCs are mentioned, this disclosure extends to other devices or materials that have adjustable transmissivity, including electrochromic devices or suspended-particle devices, as examples.

Here, each the of the first and second layers of film 34, 36 are electrically coupled to the power source 22. The power source 22 is configured to apply a voltage to the first and second layers of film 34, 36, as commanded by the controller 20. The first and second layers of film 34, 36 may be tinted in a color different than a color of the remainder of the outer lens 26, such as being tinted black while the remainder of the outer lens 26 is clear, in an example.

With no applied voltage, the liquid crystals within the first and second layers of film 34, 36 are randomly arranged in the droplets, resulting in scattering of light as it passes through the respective first and second layers of film 34, 36, which in turn results in the first and second sections 28, 30 being in an opaque state. As voltage is applied to the first and second layers of film 34, 36, the liquid crystals align within the first and second layers of film 34, 36, allowing light to pass through the droplets with less scattering, resulting in a partially opaque state, and with additional applied voltage, even less scattering until the corresponding first and second sections 28, 30 exhibit a transparent state. If a relatively high voltage is applied, the first and second layers of film 34, 36 can transition from the opaque state to the transparent state almost instantaneously. The degree of transparency of the first and second sections 28, 30 can be controlled by adjusting the applied voltage.

In one example, as shown in FIG. 3, the first light 32 is electrically coupled to the power source 22 in parallel with the first layer of film 34 such that, when the first light 32 is activated, the first layer of film 34 will have voltage applied thereto, such that the first layer of film 34 is in a transparent state, thereby permitting the light from the first light 32 to pass through the lens assembly 25. Likewise, the second light 33 is connected to the power source 22 in parallel with the second layer of film 36, such that the second layer of film 36 exhibits a transparent state when the second light 33 is activated.

While parallel electrical connections are shown and described in FIG. 3, this disclosure is not limited to the configuration of FIG. 3. Specifically, the first and second layers of film 34, 36 do not need to be electrically connected in parallel with a corresponding one of the first and second lights 32, 33.

Further, while the first and second layers of film 34, 36 are shown as being separate from the outer lens 26, the first and second layers of film 34, 36 could be integrally formed with the outer lens 26, such as by being embedded or sandwiched into the outer lens 26.

As mentioned above, the transmissivity of the first and second sections 28, 30 is adjustable by a user via a human-machine interface within a passenger cabin of the vehicle 10, for example. However, in another aspect of this disclosure, the transmissivity of the first and second sections 28, 30 is adjustable by a user only when the corresponding first and second light 32, 33 is not activated (i.e., not illuminated or turned off). In this manner, a user is not permitted to lessen the transmissivity of the first and second lights 32, 33 when those lights are active. Further, the controller 20 could be programmed such that the first and second sections 28, 30 default to being opaque, as long as the corresponding first and second light 32, 33 is not active.

Figure 4:
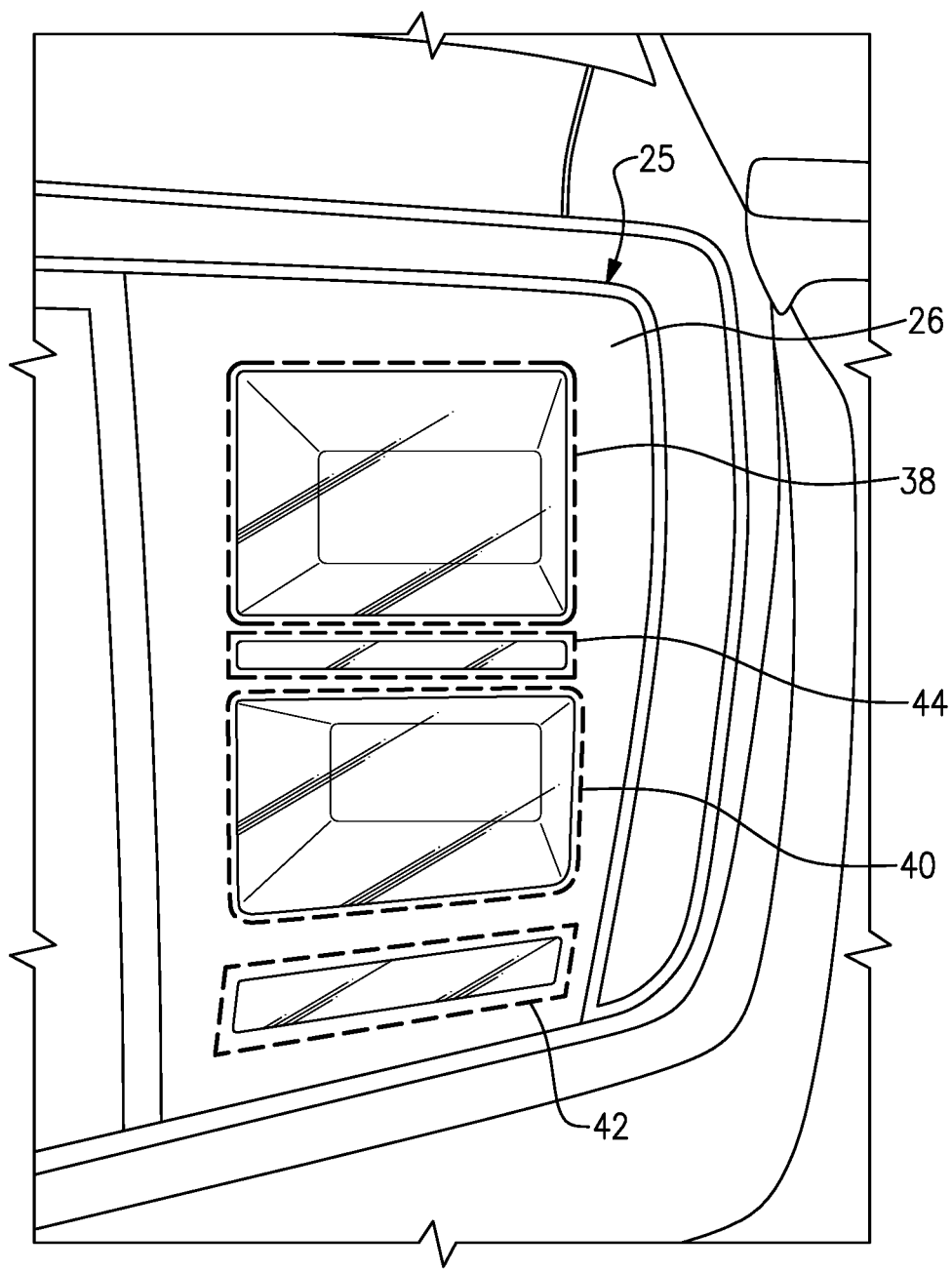
FIG. 4 is a close-up view of another light assembly.

While in FIGS. 2 and 3 the lens assembly 25 includes two sections having adjustable transmissivity, this disclosure extends to lens assemblies with a different number of sections having adjustable transmissivity, including one or more such sections. As one example, FIG. 4 illustrates an alternate configuration of the lens assembly 25 with an outer lens 26 having four sections 38, 40, 42, 44, each configured substantially similar to the first and second sections 28, 30 described above. In the example of FIG. 4, section 38 corresponds to a low beam headlamp, section 40 corresponds to a high beam headlamp, section 42 corresponds to a daytime running lamp, and section 44 corresponds to a turn signal. Each section 38, 40, 42, 44 includes an independent layer of film having an independently-adjustable light transmissivity in response to an applied voltage from the power source 22. Each section 38, 40, 42, 44 may exhibit a unique tint. For example, section 44 may exhibit an amber tint.

Figure 5:
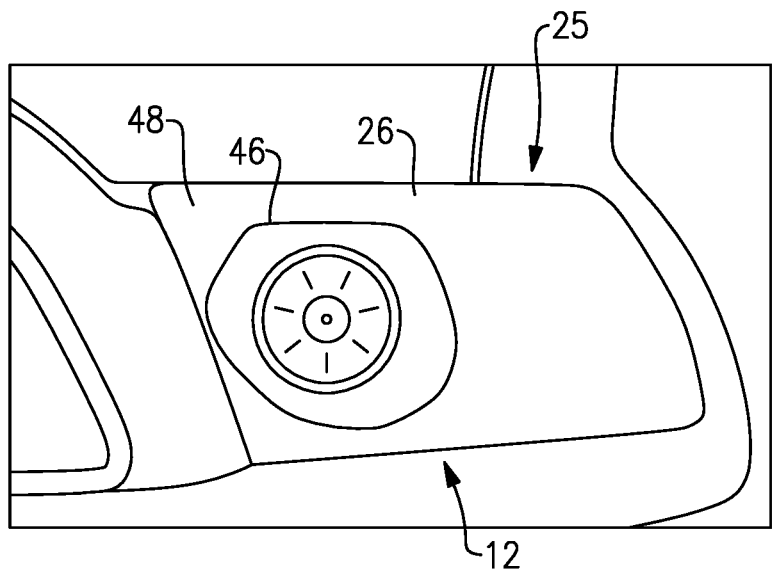
FIG. 5 is a close-up view of still another light assembly.
Figure 6:
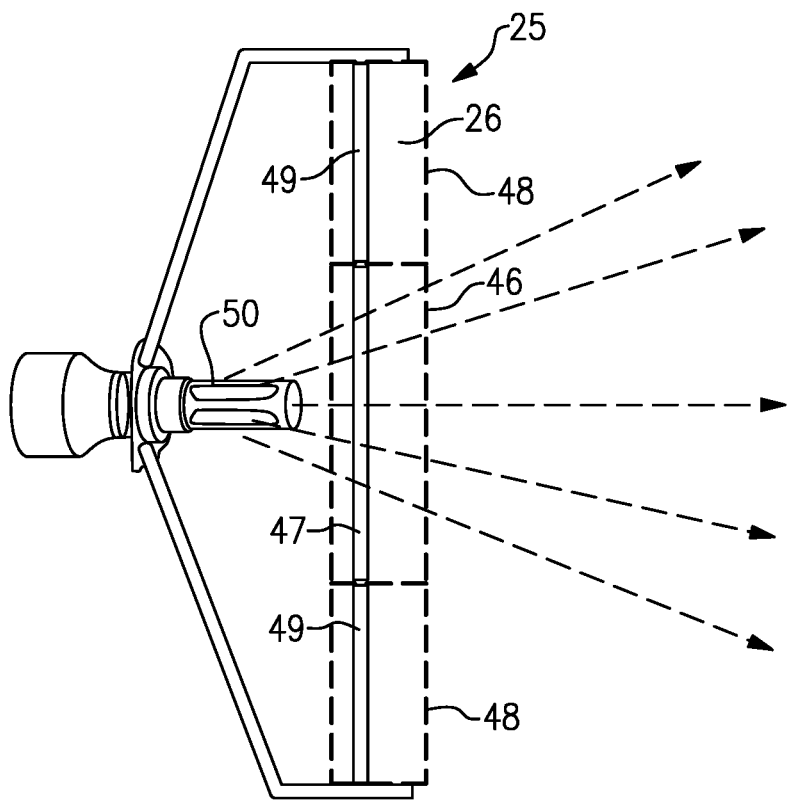
FIG. 6 is a schematic representation of the light assembly of FIG. 5.

FIGS. 5 and 6 are representative of an aspect of this disclosure in which the lens assembly 25 includes only a single section having adjustable light transmissivity. In this example, the section 46 exhibits an adjustable light transmissivity, whereas a remainder 48 of the outer lens 26 by surface area is tinted such that the outer lens 26 is not clear. As shown in FIG. 6, a first layer of film 47 having adjustable transmissivity is applied to outer lens 26 within section 46, and a second layer of film 49 having a non-adjustable transmissivity is applied to outer lens 26 throughout the remainder 48. The remainder 48 does not cover any lights, in this example.

In this example, when the section 46 is in an opaque state, the section 46 substantially matches a tint of the remainder 48 of the outer lens 26. For instance, the remainder 48 may exhibit a dark black tint, whereas the section 46 will exhibit a substantially similar dark black tint when no voltage is applied to the layer of film associated with the section 46. On the other hand, when a light 50 is activated, the section 46 will be in a transparent state and permit light emitted by light 50 to pass through section 46. The embodiment of FIGS. 5 and 6 could be combined with the embodiment of FIGS. 2 and 3, such that any portion of the lens 26 not covered by the first and second sections 28, 30 could include a non-adjustable layer of film providing that portion with a particular, non-adjustable tint. That non-adjustable tint could substantially match a tint of the first and/or second sections 28, 30 when a voltage is not applied to those sections.

It should be understood that terms such as "left," "right," "about," "substantially," and "generally" are not intended to be boundaryless terms, and should be interpreted consistent with the way one skilled in the art would interpret those terms. Further, directional terms such as "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A lighting system for a motor vehicle, comprising:
a lamp assembly including a lens assembly, wherein the lens assembly includes a first section and a second section, wherein the first and second sections each include a material having variable light transmissivity in response to an applied voltage, and wherein the light transmissivity of the first section is adjustable independent of the light transmissivity of the second section,
wherein the lamp assembly includes a first light configured to emit light through the first section and a second light configured to emit light through the second section,
wherein, when the first light is activated, the lamp assembly is configured such that the first section is transparent, and
wherein, when the second light is activated, the lamp assembly is configured such that the second section is transparent
wherein, only when the first light is not activated, the lamp assembly is configured such that the light transmissivity of the first section is adjustable to be either opaque or partially opaque; and
wherein, only when the second light is not activated, the lamp assembly is configured such that the light transmissivity of the second section is adjustable to be either opaque or partially opaque.

2. The lighting system as recited in claim 1, wherein: when the first light is activated, the lamp assembly is configured such that the second section is opaque, and when the second light is activated, the lamp assembly is configured such that the first section is opaque.

3. The lighting system as recited in claim 1, further comprising:
a power source; and
a controller configured to command the power source to selectively apply voltage to the first light, the second light, the material of the first section, and the material of the second section.

4. The lighting system as recited in claim 3, wherein:
the first light and the material of the first section are electrically connected to the power source in parallel, such that when the first light is activated, voltage is applied to the material of the first section such that the first section is transparent, and
the second light and the material of the second section are electrically connected to the power source in parallel, such that when the second light is activated, voltage is applied to the material of the second section such that the second section is transparent.

5. The lighting system as recited in claim 3, further comprising:
a sensor electrically coupled to the controller, wherein the sensor is configured to generate a signal indicative of an environmental condition adjacent the vehicle, and wherein the controller is configured to command the power source to selectively apply voltage to the material of the first section and the material of the second section in response to a signal from the sensor.

6. The lighting system as recited in claim 1, wherein:
the first light is a low beam headlamp, and
the second light is a high beam headlamp.

7. The lighting system as recited in claim 6, wherein:
the lens assembly includes a third section,
the third section includes a material configured to adjust a light transmissivity in response to an applied voltage, and
the light transmissivity of the third section is adjustable independent of the light transmissivity of the first and second sections.

8. The lighting system as recited in claim 1, wherein the material of the first section is provided by a polymer-dispersed liquid-crystal device (PDLC), and the material of the second section is provided by a PDLC.

9. The lighting system as recited in claim 8, wherein the material of the first section is a first layer of PDLC film, and the material of the second section is a second layer of PDLC film.

10. The lighting system as recited in claim 1, wherein the lens assembly includes a third section including a non-adjustable tint substantially matching a tint of the first and second sections when a voltage is not applied to the first and second sections.

11. A lighting system for a motor vehicle, comprising:
a lamp assembly including a lens assembly, wherein the lens assembly includes a first section and a second section, wherein the first section includes a material having variable light transmissivity in response to an applied voltage, wherein the second section includes a material of non-adjustable light transmissivity exhibiting a tint substantially matching a tint of the first section when the first section is opaque, wherein the lamp assembly is configured to function as a headlamp.

12. The lighting system as recited in claim 11, wherein the material of the first section is adjustable between being opaque, partially opaque, and transparent.

13. The lighting system as recited in claim 12, wherein, when the first section is opaque, the first section and second section both exhibit a dark black tint.

14. A method, comprising:
adjusting a light transmissivity of a first section of a lens assembly independent of a second section of the lens assembly, wherein the lens assembly is part of a lamp assembly of a motor vehicle;
adjusting the first section such that the first section is transparent when a first light configured to emit light through the first section is activated;
adjusting the second section such that the second section is transparent when a second light configured to emit light through the second section is activated;
only when the first light is not activated, adjusting the light transmissivity of the first section to be either opaque or partially opaque; and
only when the second light is not activated, adjusting the light transmissivity of the second section to be either opaque or partially opaque.

15. The method as recited in claim 14, wherein:
the adjusting step is performed based on signals from a sensor, wherein the sensor is configured to generate signals indicative of environmental conditions adjacent the vehicle.

* * * * *